United States Patent Office 3,398,191
Patented Aug. 20, 1968

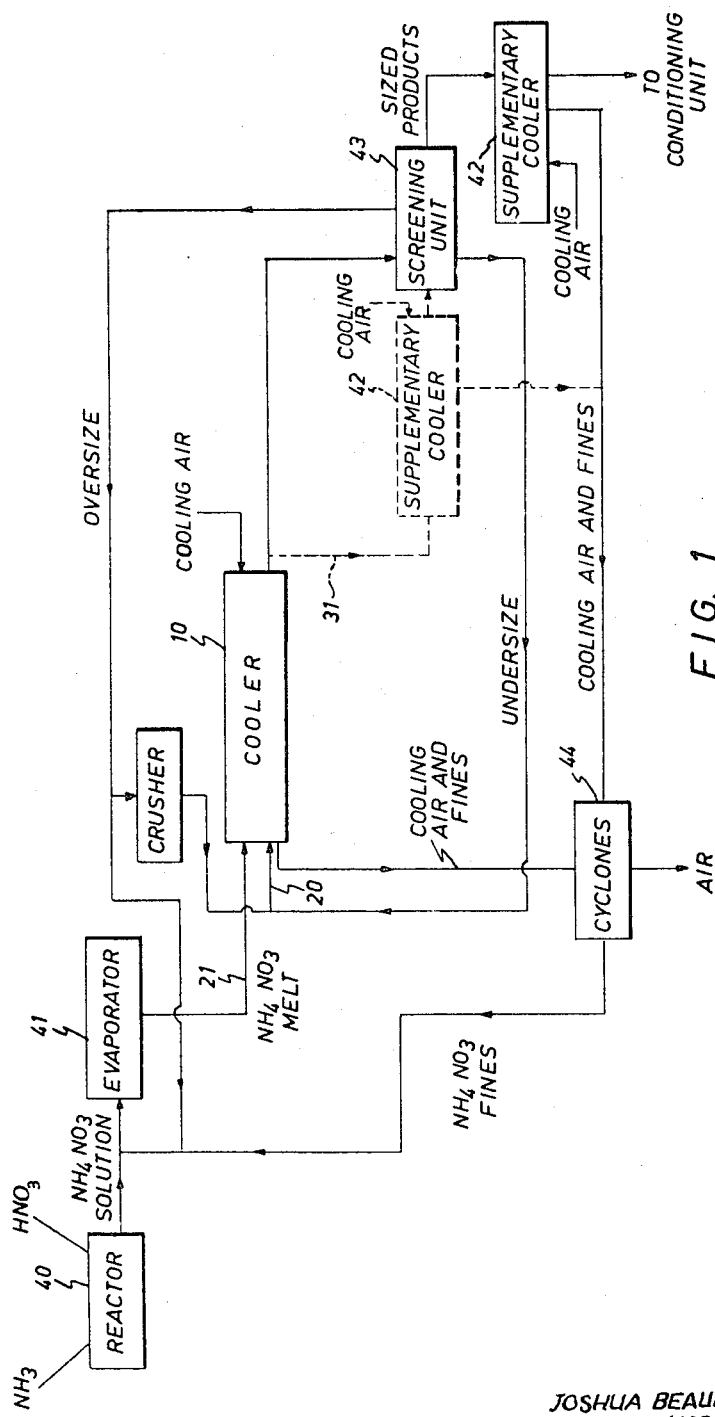

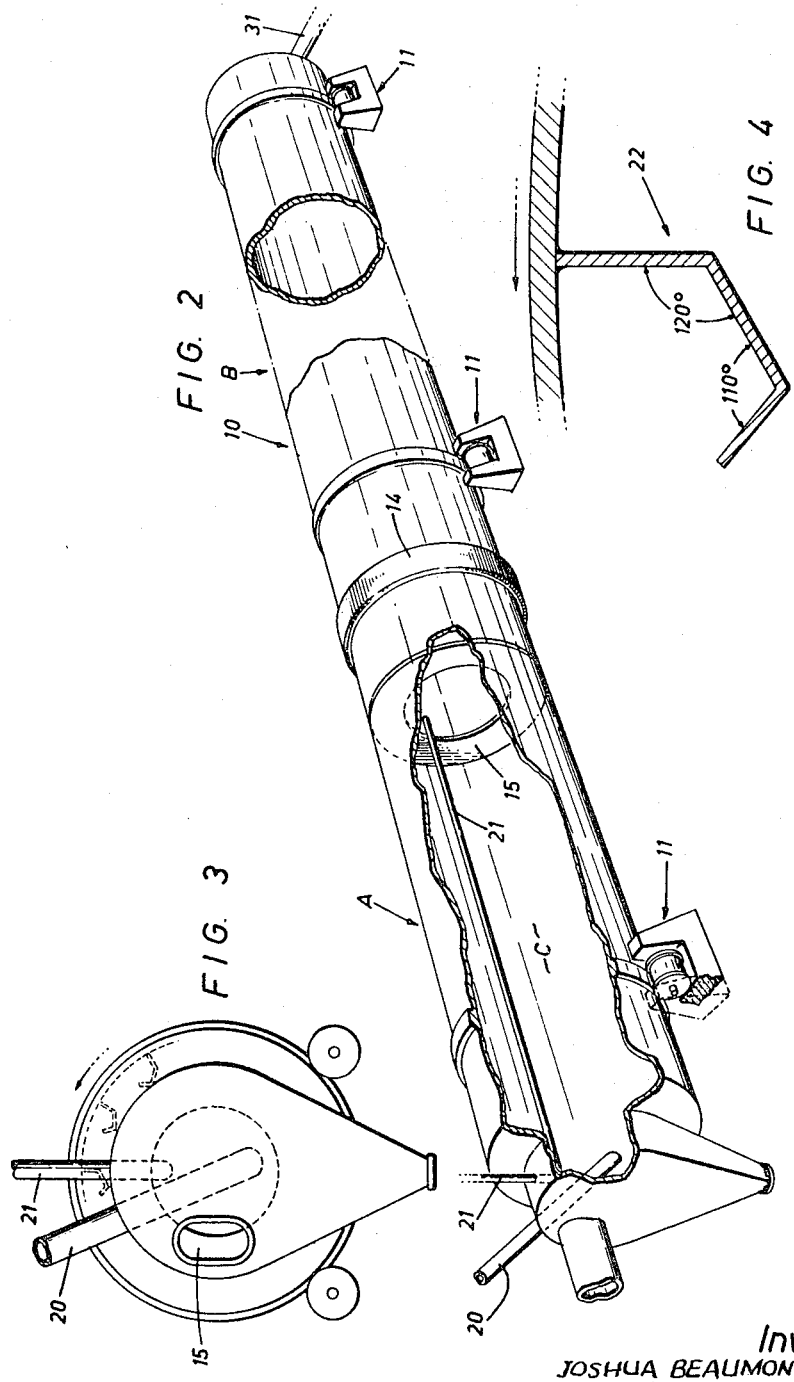

3,398,191
PROCESS FOR THE PRODUCTION OF GRANULAR NITROGENOUS COMPOUNDS
Joshua Beaumont Thompson and Gordon Charles Hildred, Trail, British Columbia, Canada, assignors to Cominco Ltd., a company of Canada
Continuation-in-part of application Ser. No. 189,551, Apr. 23, 1962. This application Dec. 9, 1963, Ser. No. 329,127
The portion of the term of the patent subsequent to Feb. 1, 1983, has been disclaimed
8 Claims. (Cl. 260—555)

This invention relates to a process for the production of nitrogenous compounds in granular form. It is particularly directed to providing a process for the production of ammonium nitrate, urea and the like nitrogenous compounds in the form of granules which are characterized by their low moisture content, their strong, hard, physical structure, high density and reduced tendency to cake.

This application is a continuation-in-part of our application Ser. No. 189,551, filed Apr. 23, 1962, now U.S. Patent No. 3,232,703.

Processes for the production of ammonium nitrate prills, granules or pellets are well known and are in relatively widespread use. Known processes include that in which a concentrated, for example 95% aqueous solution of ammonium nitrate is sprayed into the upper part of a tower. The droplets are cooled and solidify as they settle downwardly through the tower in counter-current to the upward flow of cooling gas. The so-formed prills are collected from the bottom of the tower and dried. This process is disclosed in the Williams et al. United States Patent No. 2,402,192, issued June 18, 1946. Prills recovered from the spray tower must be cooled and dried under carefully controlled conditions to extract moisture from the cores of the prills without destroying the crystalline structure of the shells.

United States Patent No. 2,934,412, issued Apr. 26, 1960, discloses a modification of the Williams et al. process in which molten, substantially anhydrous ammonium nitrate is sprayed into a gaseous cooling medium. Prills produced by this later process have the disadvantage that they are of a wide range of sizes and have voids in the surfaces which tend to reduce their strength and their resistance to impact and the surfaces tend to be glassy which makes difficult the treating of the prills with a conditioning agent, such as diatomaceous earth, due to poor dust adherence.

Other known processes for the production of prills are disclosed in Patent No. 2,774,660, issued Dec. 18, 1956 and Patent No. 2,782,108, issued Feb. 19, 1957. Prills produced according to these processes contain moisture which must be removed resulting in the formation of porous particles having relatively smooth surfaces. These particles are undesirably fragile as a result of their porous interior structures and are more difficult to condition with an agent such as diatomaceous earth than the improved product of the present invention.

It is also known that fertilizer pellets can be produced in a granulator by contacting moving particles of chemical fertilizer with an aqueous slurry or a solution of fertilizer. In United States Patent No. 1,969,894, issued Aug. 14, 1934, a modification of this type of "mixing" process is disclosed in which a blunger is employed for mixing ammonium phosphate fines with a slurry comprised of ammonium phosphate particles and ammonium phosphate solution. With the aid of a re-circulation circuit, the fine granules are built, step by step, to production size. A normal operating re-circulating load to production ratio is of the order of about 8:1.

A further modification of the "mixing" type process is disclosed in United States Patent No. 2,926,079, issued Feb. 23, 1960 in which fertilizer mixtures are produced by coating fertilizer particles with an aqueous slurry which contains a substantial amount of fertilizer solids. In the provided bed of nuclei of a fertilizer substance having a particle size of at least about 40 mesh and a moisture content below the agglomeration point, constant agitation and the film coating resulting from the liquid phase present produce a physical separation from each other of a substantial portion of the nuclei. Separated nuclei are passed through a hot (120° C.–540° C.) gaseous atmosphere into which is sprayed an aqueous slurry of fertilizer substances in the form of fine droplets whereby the separated nuclei are contacted by the fine droplets and coated with slurry.

We have found that this "mixing" type process also has certain disadvantages, particularly in the production of ammonium nitrate, urea and the like nitrogenous pellets. The temperature to which the drying air can be heated for treatment of ammonium nitrate, for example, is limited by the low fusion point of the particles and by the liquid phase present which tends to weaken physically the coated nuclei. Substantial disintegration of the pellets occurs if they are screened while hot. Also, we have found, in the production of ammonium nitrate pellets, that the pellets produced by spraying a concentrated aqueous solution into a hot gas and onto ammonium nitrate nuclei tend to be structurally too weak for sizing by screening even if they contain as little as 0.35% moisture when their temperature is above about 80° C. Maintaining the product temperature below 80° C. limits the amount of liquid phase which can be tolerated in the bed of nuclei and makes necessary the use of a much larger granulating vessel than is required for the same rate of production of other types of fertilizer pellets having a higher fusion point than ammonium nitrate.

We have found that disadvantages in the operation of known processes, and in the ammonium nitrate, urea and the like nitrogenous pellets produced by these processes can be overcome by the process of the present invention. The process of the present invention comprises the steps of forming in a rotatable horizontally elongated contact zone, a bed of moving, solid particles of a nitrogenous compound such as ammonium nitrate or urea, advancing the particles which constitute the bed longitudinally through said contact zone, continuously raising solid particles from said bed to the upper regions of said contact zone and releasing the raised solid particles to cascade downwardly through said contact zone, as a continuous curtain of solid particles extending the length of the contact zone, to said bed, spraying a substantially anhydrous melt of said nitrogenous compound at a temperature of from about 5 to about 25 centigrade degrees above its crystallization temperature onto said bed and into a curtain of solid particles of the nitrogenous compound continuously cascading downwardly onto said bed, and simultaneously contacting the continuously cascading particles with a current of cooling air passing counter-current to the direction of advance of said particles.

An important object of this process is to obtain, as a product, ammonium nitrate, urea or the like nitrogenous granules of low moisture content; of strong, hard, physical structure; of high density; of reduced tendency to cake; and of a particle size larger and more closely sized than obtainable in existing processes, in the range −6 mesh (Tyler, 0.131 inch screen opening) to +14 mesh (Tyler, 0.046 inch screen opening), preferably −6 mesh to +10 mesh (Tyler, 0.065 inch screen opening).

An understanding of the process of this invention can be obtained from the following description, to which the scope of the process is not restricted, reference being made to the accompanying drawings in which:

FIGURE 1 is a flowsheet of an overall process for the production of granules of a nitrogenous compound in which the process of this invention is incorporated as a step;

FIGURE 2 is an elevation, in section and in perspective, of a preferred embodiment of a rotary granulating and cooling apparatus;

FIGURE 3 is an end elevation of the granulating and cooling apparatus illustrated in FIGURE 2; and FIGURE 4 is an enlarged detail view of lifting element.

Like reference characters refer to like parts throughout the description of the invention and the drawings.

Referring to FIGURES 2 and 3 of the drawings, the numeral 10 indicates a cooler rotatably supported on roller wheels enclosed in boxes 11 and driven by a motor through a train of speed reduction gears, not shown, the last of which is meshed with a ring gear 14 which encircles the cooler.

The cooler can be formed of a steel shell and is divided transversely by an upstanding retaining ring 15 into a coating-cooling chamber A and a cooling chamber B. The coating-cooling chamber A encloses a rotatable, horizontally elongated contact zone C in which solid particles of a nitrogenous compound are simultaneously contacted with said compound in sprayed molten, substantially anhydrous form and cooling air; the cooling chamber B encloses a cooling zone.

Although the operation of the present process is described hereinbelow in detail with particular reference to the production of ammonium nitrate in granular form, it will be understood that this description is illustrative only, and that the process can also be used to advantage in the production of urea and the like nitrogenous compounds in granular form suitable for use as fertilizers, animal foods and/or industrial purposes.

An inlet 20 for finely divided particles of ammonium nitrate is provided at the inlet end of the coating-cooling chamber. A spray feed pipe 21 extends into the coating-cooling chamber, being centrally located and is connected to a source of molten, substantially anhydrous ammonium nitrate. The spray feed pipe is provided with one or more nozzles, not shown, from which molten ammonium nitrate is sprayed in the form of fine droplets whose size can be controlled by the spraying pressure and which, while falling through the current of cooling air, impinge on cascading particles and on bed particles in the region of the lifters emerging from the tilted moving bed. Lifting bars 22 are secured to the interior wall of the coating-cooling chamber from a point adjacent to, but spaced from the inlet end to a point adjacent to but spaced from the retaining ring 15.

The cooling chamber B also is equipped with lifting bars. A chute 31 is provided for discharging cooled granules from cooling chamber B.

Ambient temperature air is drawn into cooling chamber B at the granule discharge end. In the present application, ambient temperature air refers to air at the temperature of the atmosphere surrounding the process equipment or the building containing it. Air at this temperature enters the cooling zone. In the case where the contact zone and the cooling zone are enclosed within one vessel, the increased temperature of the air entering the contact zone results solely from heat exchange with the coated nitrate particles in the cooling zone. Where the contact zone and the cooling zone are enclosed in separate vessels, the cooling air entering each zone will be ambient temperature air.

The molten, substantially anhydrous nitrogenous compound such as ammonium nitrate or urea required for the present process may be obtained by any convenient means. However, in the operation of the overall process for the production of ammonium nitrate, for example, as illustrated schematically in FIGURE 1, an aqueous ammonium nitrate solution is prepared in reactor 40 according to conventional practice. This solution is passed to an evaporator, or a series of evaporators, indicated by the numeral 41, wherein the ammonium nitrate concentration is increased to at least about 98%, and preferably to above 99%, ammonium nitrate. That is, the aqueous ammonium nitrate solution is converted to a substantially anhydrous ammonium nitrate melt. The evaporators 41, which can be of the conventional film type, and the pipe line to the coating-cooling chamber are maintained at a temperature safely above the fusion point of the ammonium nitrate so that the ammonium nitrate melt passed to the spray feed pipe 21 is in a fluid condition.

Ammonium nitrate granules produced in the cooler 10 can be passed to a supplementary cooler 42 and the cooled granules passed to a conventional screening unit 43 in which granules are separated into desired size range ammonium nitrate granules, oversize granules and undersize granules. Preferably, however, the granules from cooler 10 are screened, the production size granules are passed to the supplementary cooler 42 and then to a conditioning unit for coating with a conditioner, such as diatomite.

Cooling air drawn through the cooler 10 and that drawn through the supplementary cooler 42 are passed to dust separators 44, such as cyclones or wet scrubbers, in which entrained ammonium nitrate fines are separated prior to the discharge of the air to the atmosphere.

The cooler 10 used in the tests described in detail hereinafter was 8½ feet outside diameter, 45 feet long with an inclination to the horizontal of 0.41 inch per foot of length downwardly from the feed to the discharge end. It was rotated at the rate of four revolutions per minute in a counterclockwise direction considered from the feed end. The retaining ring 15 was positioned 16 feet from the feed end and extended 2 feet perpendicularly to the wall. Two sets of 12 uniformly spaced lifting elements each were provided in the coating-cooling chamber. The set nearest the feed end which feeds material towards the second set, comprised lifters 2 feet long extending 6 inches perpendicularly to the wall surface but positioned at an angle of 60° to the longitudinal axis of the chamber. A 6-inch gap was left between the inner ends of these lifters and the ends of the other set of 12 lifting elements 22, each 12 feet long and extending lengthwise of the chamber, each extending 6 inches in a first section perpendicularly to the wall with a second section 6 inches long at an angle of 120° to the first section, and a third, or outer, section 4 inches long at an angle of 110° to the second section as shown in FIGURE 4. This apparatus produced desired size ammonium nitrate granules, i.e. granules within a predetermined narrow size range, at a rate of 60 tons per day with a bed maintained at about 9000 pounds.

In the following description of the operation of the process, the term "cores" includes particles of ammonium nitrate, urea and the like nitrogenous compounds which are smaller than the smallest desired product size, that is, less than 0.065 inch diameter but not small enough to be entrained with the exit cooling gas. Particles entrained with the cooling gas can be recovered in the cyclone 44 and redissolved in solution passed to the evaporators.

This invention is independent of the source of the finely divided nitrogenous particles, or cores, included in the bed of rolling particles and the downwardly falling curtain of particles in the contact zone, that is, that portion of the coating-cooling chamber limited by the ends of the lifting elements. Satisfactory and logical sources of these cores are the undersize particles recovered from the screening unit 43. Undersize particles are illustrated in FIGURE 1 as being passed to the feed inlet 20. These finely divided particles together with already coated cores and particles solidified from melt spray not adhering to finely divided particles in the rolling bed and curtain, form the rolling bed and falling curtain in the contact zone. If necessary, the supply of cores can be supplemented by crushing oversize particles recovered from the screening unit. Oversize particles in excess of this amount can be dissolved and returned to the evaporators 41.

The volume of the contact zone occupied by the rolling bed or the degree of filling, which governs the permissible amount of liquid phase in the bed, is controlled by several factors such as the size, the degree of inclination to the horizontal, and the rate of rotation of the coating-cooling chamber and the effectiveness of the lifting elements 22; the production rate; the temperature of the melt and the heat removal capacity of the cooling air.

In the operation of the process, a bed of desired volume is maintained in the coating-cooling chamber A. The individual particles which constitute the bed are advanced through coating-cooling chamber A in a constantly moving state due to the rotation of the apparatus. The lifting elements carry cores to the upper region of the contact zone where they are released to cascade to the bottom, forming, in effect, a continuous shower or curtain of individual particles designed to fill as much as possible the cross-sectional area of the contact zone throughout the length of the said contact zone.

The substantially anhydrous, molten nitrogenous compound is sprayed in the form of molten droplets into this shower of cores and adheres to and coats the solid particles as they shower downwardly and also adheres to and coats the solid particles at the surface of the moving bed. The liquid coating is further distributed on particles in the bed owing to the contacting, rolling action.

We have found that the concentration and the temperature of the sprayed melt are important. The melt should contain at least about 98% of the nitrogenous compound. At lower concentrations it is difficult, if not impossible, to avoid uncontrollable agglomeration of cores and high recirculating dust load at a practicable production rate. Concentrations higher than about 99.6% are more costly to prepare in the evaporators and are not necessary. The preferred range of concentration is from about 99% to about 99.5%.

The ammonium nitrate and urea melts are sprayed at a temperature of from about 5 to about 25, preferably about 10 centigrade degrees above their crystallization temperatures. For example, a melt which contains 98% ammonium nitrate has a crystallization temperature of 149° C. Therefore, the melt would be sprayed at a temperature of at least 154° C. and preferably 159° C. Similarly, a melt which contains 99.5% ammonium nitrate has a crystallization temperature of 163° C. and would be sprayed at a temperature of about 173° C. The sprays are arranged, of course, to cover the entire length of the contact zone and are preferably directed towards the lifters covered by the rolling bed and cascading particles to avoid liquid contact with bare lifters.

Cooling air, at atmospheric temperature, is drawn into the cooling chamber B and flows into and through the coating-cooling chamber A counter-current to the direction of advance of the bed of solid particles. Its rate of flow is regulated to provide the cooling effect necessary to solidify the coatings of sprayed melt on the cores in the time required to avoid particle agglomeration after uniform coating has been accomplished. During the test reported in the examples below, for a total cooler discharge weight of about 180 tons of granulated ammonium nitrate per day, from which about 60 tons per day of product granules within a predetermined narrow size range were recovered, air was supplied at atmospheric temperature, at about 16° C., at the rate of about 6000 standard cubic feet per minute (0° C. and 760 mm. of mercury pressure). The cooling requirement for the anhydrous melt film coating on the cores is determined by the sensible heat content of the melt beyond that at its crystallization temperature, and the heat released as crystallization takes place. For example, the heat of crystallization of 99.5% ammonium nitrate is 31 B.t.u.'s per pound or 17.2 calories per gram.

The most effective results from the spraying of the melt and from the cooling achieved by the flow of air entering the process at ambient temperature are obtained if the design of the lifters in the coating-cooling chamber is such that the distribution of showering particles is as uniform as possible throughout the vertical cross-sectional area of the contact zone, thus reducing "channelling" of the cooling gas to a minimum. The importance of cooling in the present process can be appreciated from the fact that the contact zone is followed directly by a further cooling zone and, preferably, the coating-cooling chamber is only one section of a rotary cooler which is separated into two sections by the retaining ring 15 which helps ensure an adequate depth of bed of cores for the coating treatment. It should be noted that operation of a contact zone and a cooling zone in two succeeding but separate vessels lies within the scope of the present process. An additional rotary cooler 42 can be included, if desired, following the cooler 10 either directly or, preferably, with a screening unit 43 between them.

A portion of the cores required to ensure a continuing re-cycle load for feed to the coating-cooling chamber is obtained through solidification of individual sprayed droplets which have not adhered to existing cores. Although agglomeration of larger particles or cores is undesirable, it is helpful to have a certain amount of agglomeration of some of the smaller particles in the bed. This agglomeration helps to form further particles for coating. Coating the cores with the melt film by spraying and cooling the coated particles by intimate contact with the cooling gases are repeated until the particles are of the desired finished product size. The number of times a particle may receive a coating will be affected by how frequently it is in the way of spray droplets while showering downwardly through the contact zone onto the bed of particles or as a surface particle in the rolling bed during its passage through the contact zone and the length of time the particle is in contact with the unsolidified melt in the bed. The time a particle is in the coating-cooling chamber will be influenced, also, by the effect of the pressure of feed cores entering the coating-cooling chamber in pressure thrust towards the discharge end, the effect of back pressure of the coated particles held by the retaining ring, and the effect of the sprayed ammonium nitrate melt hitting the particle. A counter-current flow of cooling gas hitting the showering particles also tends to increase the time required for particles to pass through the contact zone.

The following examples illustrate the results obtained in the operation of the process of this invention.

Example 1

The circuit described above and having the supplementary cooler 42 before the screening unit 43 was operated over a ten-day period during which production attained a maximum of from about 50 to about 60 tons per day of product ammonium nitrate granules approximately of the size range indicated in Table 3. The sprayed melt contained from 98% to 99.6% ammonium nitrate. At the lower concentration and a high spray melt temperature, agglomeration occurred in the bed of particles. The best results were obtained with ammonium nitrate concentrations of from 99% to 99.5%. The ratio of re-cycled undersize and oversize ammonium nitrate particles to particles within the predetermined size range averaged about 2.5:1 or 2.5 tons of re-cycled particles per ton of product granules within the predetermined size range.

The data set out in Tables 1 and 2 hereinafter are illustrative of reasonably stable operating periods. At the start of the test period, the ammonium nitrate concentration was 98.4% and, following that, ranged from 99.4% to 99.6%. Full cone spray pattern nozzles of the "Fulljet" injector type (Spraying Systems Company), with $13/64$ inch orifice, were used in the test.

TABLE 1.—COOLER

| | $NH_4NO_3$, percent | Crystallizing temp., °C. | Spray pressure, p.s.i. | Spray temp., °C. | Cooling air temperature, °C. | | Salt temperature, °C., Out | Moisture content product granules, percent |
|---|---|---|---|---|---|---|---|---|
| | | | | | In | Out | | |
| 1 | 98.4 | 152 | 21.5 | 180 | 13 | 52 | 35 | .18 |
| 2 | 99.5 | 163 | 20.5 | 176 | 17 | 65 | 45 | .05 |
| 3 | 99.4 | 162 | 18.0 | 174 | 18 | 66 | 47 | .04 |

TABLE 2.—SUPPLEMENTARY COOLER

| | Cooling air temperature, °C. | | Salt temperature, °C., out | Moisture content product granules, percent | Product, pounds per minute | | | |
|---|---|---|---|---|---|---|---|---|
| | In | Out | | | Oversize | Product | Re-cycle[1] | Re-cycle: Product Ratio |
| 1 | 13 | 30 | 20 | .13 | N.A. | 47 | 157 | 3.3:1 |
| 2 | 17 | 36 | 19 | .05 | 18 | 84 | 144 | 1.7:1 |
| 3 | 18 | 38 | 26 | .03 | 7 | 74 | 142 | 1.9:1 |

[1] Re-cycle includes oversize material which in this test was not re-cycled as dry feed.
N.A.—Not available.

Example 2

Samples of product from the above operation were taken and compared with samples of commercially available prilled ammonium nitrate produced at two different conventional spray tower plants. Comparisons were made on the basis of bulk density, screen analysis, sphericity (determined by percentage of particles rolling from top to bottom of an inclined plane), hardness, and tendency to cake (short term test only).

The results, which are tabulated below, showed that the granules coated by the present process;

(a) have a greater bulk density than prills, thereby permitting use of smaller bags for packaging;

(b) can be obtained in larger sizes than are obtained by prilling;

(c) have reasonable sphericity, relative to the prilled product;

(d) are harder individually than ammonium nitrate prills; and (e) present a reduced caking problem when adequate diatomite coating is used.

The improved physical characteristics of ammonium nitrate granules produced by the present process over those of prills produced by a conventional spray process are illustrated by Table 3.

TABLE 3

| | Present Process | Conventional process | |
|---|---|---|---|
| | | Plant A prill | Plant B prill |
| Bulk density (lbs./cu. ft.) | 53.7 | 48.8 | 47.7 |
| Screen analysis (in percent), standard Tyler screen mesh: | | | |
| +6 | 0.4 | | |
| +8 | 51.5 | 0.3 | 1.2 |
| +10 | 94.7 | 58.5 | 54.3 |
| +12 | 97.1 | 78.5 | 74.7 |
| +14 | 98.9 | 93.4 | 88.7 |
| +20 | 99.7 | 98.5 | 96.6 |
| +28 | 99.8 | 99.2 | 98.8 |
| +35 | 99.9 | 99.5 | 99.6 |
| +100 | 99.9 | 99.7 | 99.8 |
| −100 | 0.1 | 0.3 | 0.2 |
| Sphericity (percent −8 mesh (0.093 inch) to +10 mesh (0.065 inch): particles rolling to bottom of inclined plane) | 17.5 | 21.4 | 9.0 |
| Hardness (weight in grams to crush 50% of particles from sphericity test) | 1,840 | 750 | 1,060 |
| Caking: | | | |
| Cake breaking strength, lbs | 22±6 | 46±6 | 37±6 |
| Diatomite coating level, percent | 2.5 | 2.7 | 3.9 |

NOTE.—Adhesion of diatomite addition to granules produced by the present process up to and including 3% is good.

For any set production rate, set re-cycle rate and set finished product size range, an equilibrium condition will obtain in the coating-cooling chamber, despite the apparent changes continuously taking place therein. While particles are continuously agitated in the moving bed and rolling one against another, other particles, many of which have already been coated with melt, are continuously being carried by the lifters out of the rolling bed, while at the same time further particles are being showered down from lifters through the melt spray. Screened undersize and crushed oversize particles are continuously added at the feed end and molten ammonium nitrate is added by means of the melt spray. Coated granules continuously advance toward and pass over retaining ring 15 into the cooling chamber B.

The efficient transfer of heat to the cooling gas from the cores is important.

The large mass of rolling particles in the particle bed tends to retain heat. Cooling effect is relative to the ratio of showering to rolling particles, that is the ratio of lifted to unlifted material. It may be thought that the most rapid solidification of the melt coating is the desirable goal, but it is a solidification achieved through controlled cooling which is desired. Should a colder gas be used for cooling purposes, then a lesser volume would be admitted in order that the same overall cooling effect would result. Although additional expenditure could be made to supply artificially cooled air, this is considered unnecessary in normal operation. When producing 60 tons per day of desired product size granules the supply indicated earlier, say 6000 standard cubic feet per minute, of air at ambient temperature which, in the plants where the above test work was carried out, ranges from about 10° C. to 30° C. over the year, is satisfactory for operation of the process.

It has been emphasized above that the important feature of the cooling air is its capacity for removal of sensible heat, regardless of the initial temperature of the gas or the volume used. There are practical limitations on the initial temperature of the cooling gas, for not only must it be cooler than both the spray melt and the particles of the rolling bed in order that a more rapid solidification be achieved than is possible merely by contact of the melt film and the particles which are at a lower temperature than the melt but, as has been already stated, physically weakened ammonium nitrate particles tend to be produced if nuclei having even as low a water content as 0.35% are permitted to remain at a temperature over 80° C. It is desirable, therefore, to have the inlet temperature of the cooling gas sufficiently low that the temperature of cooled particles being screened will be lower than 80° C. and preferably lower than 60° C. Satisfactory operation of the process can be achieved with cooling air at an outlet temperature as high as 100° C. but for maximum rates of production and efficient screening and crushing, it is preferable that the outlet temperature of the cooling air should not exceed 80° C. and that the outlet temperature of the cooled particles should not exceed 60° C. The ambient temperature of the air in any location where the process of this invention might be operated is unlikely to be higher than about 50° C. and use of an adequate flow of cooling air at such a temperature to achieve satisfactory cooling is quite practicable.

We have also stated that we recommend the temperature of the melt for spraying be within the range of from about 5 to about 25 centigrade degrees above the crystallization temperature of the melt. Operational difficulties arise if the melt temperature lies outside this range. For example, very careful temperature control through the length of the spray feed lines is essential, of course, to avoid solidification of the melt at temperatures below the range and, also, it is essential that the sprayed material remain liquid long enough to coat the cores uniformly. With melt temperatures above the range, apart from the unnecessary heating and cooling required, uncontrollable agglomeration occurs in the contact zone.

In the manner described in detail hereinabove with reference to the production of ammonium nitrate, granules of urea can be produced by spraying a superheated melt of substantially anhydrous urea at a temperature of from about 5 to about 25, preferably about 10, centigrade degrees above its crystallization temperature, onto continuously cascading solid urea particles while simultaneously contacting the particles and melt with a current of cooling air. As with ammonium nitrate, the urea melt is sprayed at a concentration above 98% and preferably above 99% urea. Furthermore, it is also desirable to have the inlet temperature of the cooling gas sufficiently low such that the temperature of the particles being screened is lower than about 80° C. Normally, air at ambient temperature is satisfactory for cooling purposes, but artificially cooled air can be used if desired, for example, to reduce the rate of flow of air through the granulator cooler.

The following example illustrates the results obtained in the operation of the present process in the production of granular urea.

Example 3

A granulator-cooler apparatus of the type illustrated in FIGURE 2 was employed for the continuous production, over a period of about 24 hours, of about one-third ton per hour of urea granules within the desired size of minus 7 plus 8 mesh (Standard Tyler Screen) i.e. about 0.11 inch in diameter.

The granulator-cooler 10 was 25 feet long and 5 feet in diameter with a slope of 0.25 inch per foot of length toward the discharge end. This unit rotated at about 5.2 revolutions per minute. The retaining ring 15 separating the coating-cooling chamber A from the cooling chamber B was placed 9 feet from the feed end of chamber A and extended 14 inches inwardly from the chamber wall. Lifters similar to those used in the production of granular ammonium nitrate described in detail hereinabove were provided in the coating-cooling chamber A. The weight of urea particles in chamber A was about one ton.

A steam-traced spray pipe 21 projecting into the inlet end of the chamber A sprayed molten, substantially anhydrous urea at a rate of about 1.2 gallons per minute onto the surface of the rolling bed and onto the downwardly falling curtain of particles in the chamber A. Ambient air at a rate corresponding to about 1800 cubic feet per minute at NTP was introduced at the granule discharge end of the cooling chamber B and passed through the granulator-cooler countercurrent to the travel of the urea particles. The cooling air was discharged from the granulator-cooler to a Doyle type wet scrubber to recover urea fines, and then discharged to atmosphere. No supplementary cooler was employed.

The urea granules discharged from the granulator-cooler were screened and the granules having a size of about 0.11 inch, i.e. those passing through a 7 mesh screen and retained on an 8 mesh screen, were collected for conditioning and bagging as product. The minus 8 mesh material was recycled directly to the granulator-cooler. The plus 7 mesh material was crushed in a roll crusher and the resulting fine material recycled. The ratio of recycled material to product was about 6 to 1.

The data set out in Table 4, following, relate to the production of urea as described hereinabove with reference to Example 3 and correspond to the data presented in Table 1 relating to the production of ammonium nitrate. Similarly, the data in Table 5 relate to the physical characteristics of urea produced according to Example 3 and correspond to the data on ammonium nitrate set out in Table 3 as described in Example 2 hereinabove. It will be noted from the screen analysis in Table 5 that the urea granules are all within the size range of −6 +14 mesh (i.e., 0.131 inch to 0.046 inch in diameter) and almost all within the preferred size range of −6 +10 mesh (i.e., 0.131 inch to 0.065 inch in diameter).

TABLE 4.—GRANULATOR-COOLER OPERATING CONDITIONS

| | | |
|---|---|---|
| Urea | percent | 99.5 |
| Crystallizing temp. | ° C | 132 |
| Spray pressure | p.s.i. | 47 |
| Spray temp. | ° C | 146 |
| Cooling air temperature: | | |
| In | ° C | 17–24 |
| Out | ° C | 45 |
| Urea temperature, out | ° C | 16–24 |
| Moisture content of product | percent | 0.03–0.04 |

TABLE 5

| | Present process | Conventional prilling process (using anhydrous urea) |
|---|---|---|
| Bulk density (lbs./cu. ft.) | 47.0 | 46.8 |
| Screen analysis (in percent) standard Tyler screen mesh: | | |
| +6 | | |
| +8 | 36.7 | |
| +10 | 99.8 | 11.9 |
| +12 | >99.9 | 37.6 |
| +14 | | 75.4 |
| +20 | | 97.6 |
| +28 | | 99.3 |
| +35 | | 99.6 |
| +100 | | 99.7 |
| −100 | | 0.3 |
| Sphericity (percent −8 mesh (.093″) to +10 mesh (0.065″) particles rolling to bottom of inclined plane) | 20.2 | 23.9 |
| Hardness (weight in gm. to crush 50% of particles from sphericity test) | 1,610 | 600 |
| Caking: | | |
| Cake breaking strength (lbs.) | 3.5±1 | 3.8±1 |
| Clay coating level, percent | 2.0 | 2.0 |

The test results set out in Tables 4 and 5 show that the urea particles produced by the present process are larger, harder and more uniform than those produced by the prilling process. Visual examination shows that the surfaces of the urea granules of the present process have a relatively rough and irregular texture compared with the smooth surfaces of conventional urea prills. The sphericity, bulk density and caking tendencies of the two urea products are not significantly different.

The process of this invention possesses a number of important advantages over known prior art processes for the production of ammonium nitrate, urea and the like nitrogenous compounds in granular form. Nitrogenous compounds that can be treated with advantage by the present process are those that melt without decomposition at a reasonably low temperature, e.g., below about 250° C. This invention provides a process for forming fertilizer granules which are coarser and are more closely sized than those which can be produced on an economically practical basis in a conventional spray tower. A harder product of greater bulk density is produced, possibly as a result of the contraction effect of solidifying successive melt layers on a cooler, solid dry core. As these nitrogenous compounds are normally subjected to considerable handling and attrition during transportation and/or mixing with other fertilizer ingredients, a high degree of hardness is especially advantageous. Although the granules are generally spherical, the surfaces of the granules have a rough and irregular texture which is distinct from the generally glassy surface of prills. The rough surface of the granules of the present invention permits good adherence of conditioning agents such as clay and diatomite. Such conditioning agents are applied in a separate conditioning step which usually is included in processes for the production of ammonium nitrate or urea in order to reduce the caking tendency of the product in storage.

It will be understood, of course, that modifications can be made in the preferred embodiment of the invention described herein without departing from the scope of the invention as defined by the appended claims.

What we claim as new and desire to protect by Letters Patent of the United States is:

1. The process of producing urea granules which comprises forming and maintaining in a rotatable, horizontally elongated contact zone a bed of moving solid particles of urea; adding finely divided solid particles of urea to said bed; advancing said particles through said contact zone; continuously raising solid particles from said bed to the upper region of said contact zone, releasing the raised solid particles to cascade downwardly through said contact zone as a continuous curtain of solid urea particles extending substantially the length of said contact zone, to said bed; spraying, at a temperature within the range of from about 5 to about 25 centigrade degrees above its crystallization temperature, molten, substantially anhydrous urea onto said bed and into the curtain of solid particles cascading downwardly through said contact zone onto said bed; and continuously passing a current of cooling air through said contact zone counter-current to the direction of advance of said particles.

2. The process of producing urea granules which comprises forming and maintaining a bed of continuously moving solid particles of urea in the contact zone of a rotating vessel having a horizontally elongated contact zone and a cooling zone; adding finely divided solid particles of urea to said bed; advancing said particles through said contact zone; spraying molten, substantially anhydrous urea at a temperature of from about 5 to about 25 centigrade degrees above its crystallization temperature onto said bed and into a continuously cascading curtain of said solid particles of urea extending substantially the length of said contact zone; simultaneously contacting the continuously cascading curtain of solid urea particles with a current of cooling air flowing counter-current to the direction of advance of said particles; continuously passing solid particles of urea from said contact zone to said cooling zone; passing said solid particles through said cooling air; and discharging solid particles from said cooling zone in contact with a counter-current flow of cooling zone.

3. The process of producing urea granules which comprises forming and maintaining a bed of continuously moving solid particles of urea in a rotatable, horizontally elongated contact zone of a vessel having a contact zone and a cooling zone; adding finely divided solid particles of urea to said bed; advancing said particles through said contact zone; spraying molten, substantially anhydrous urea at a temperature of from about 5 to about 25 centigrade degrees above its crystallization temperature onto said bed and into a continuously cascading curtain of said solid particles of urea extending substantially the length of said contact zone; simultaneously contacting the continuously cascading curtain of solid urea particles with a current of cooling air flowing countercurrent to the direction of advance of said particles; continuously passing solid particles of urea from said contact zone to said cooling zone; passing said solid particles through said cooling zone in contact with and counter-current to a stream of air fed into said cooling zone at ambient temperature; discharging cooled solid particles from said cooling zone; separating cooled solid particles of urea within a predetermined size range from said discharged cooled solid particles as product urea granulates; and recycling cooled solid particles of urea smaller than those within said predetermined size range to said contact zone.

4. A process of producing urea granules which comprises forming in a rotating horizontally elongated contact zone a bed of continuously moving solid particles of urea; advancing said particles through said contact zone; continuously raising said particles from said bed to the upper region of said contact zone; releasing said raised solid particles to cascade downwardly to the bed through said contact zone as a continuous curtain of solid urea particles extending substantially the length of said contact zone; spraying molten, substantially anhydrous urea at a temperature of from about 5 to about 25 centigrade degrees above its crystallization temperature onto said bed and into said curtain of solid particles of urea; simultaneously contacting the continuously cascading curtain of solid urea particles with a current of cooling air flowing counter-current to the direction of advance of said particles; continuously passing solid particles of urea from said contact zone to a rotating horizontally elongated cooling zone; continuously passing said solid particles through said cooling zone in contact with a flow of cooling air; continuously passing cooled, solid particles from said cooling zone to a screening step wherein the particles are separated into particles within a predetermined coarse size range, oversize particles and undersize particles; returning cooled undersize particles to the bed in said contact zone to be advanced therethrough; crushing cooled oversize particles and passing crushed particles to the bed in said contact zone to be advanced therethrough; and collecting the cooled particles within said predetermined coarse size range.

5. A process according to claim 4 in which the concentration of urea in said melt is from about 98% to about 99.5%.

6. A process of producing urea granules which comprises the steps of evaporating aqueous urea solution to convert said solution to molten, substantially anhydrous urea; forming in a rotating horizontally elongated contact zone a bed of continuously moving solid particles of urea; advancing said particles through said contact zone; continuously raising solid particles from said bed to the upper region of said contact zone; releasing said raised solid particles to cascade downwardly to the bed through said contact zone as a continuous curtain of solid urea particles extending substantially the length of said contact zone; spraying said molten, substantially anhydrous urea at a temperature of from about 5 to 25 centigrade degrees above its crystallization temperature onto said bed and into said curtain of solid particles of urea; simultaneously contacting the continuously cascading curtain of solid urea particles with a current of cooling air flowing counter-current to the direction of advance of said particles; continuously passing solid particles of urea from said contact zone to a rotating horizontally elongated cooling zone; continuously passing said solid particles through said cooling zone in contact with a flow of cooling air; continuously passing cooled, solid particles from said cooling zone to a screening step wherein the particles are separated into particles within a predetermined coarse size range, oversize particles and undersize particles; collecting the cooled particles within said predetermined coarse size range; returning cooled undersize particles to the bed in said contact zone to be advanced therethrough; crushing a portion of said cooled oversize particles and passing crushed particles to the bed in said contact zone to be advanced therethrough; and dissolving the remaining portion of cooled oversize particles in aqueous urea solution prior to the evaporation step.

7. A process as claimed in claim 6 in which solid urea particles entrained with the cooling air passing from said contact zone are recovered and are dissolved in said aqueous urea solution.

8. A process as claimed in claim 6 in which the particles passed to said screening step are at a temperature below 80° C.

References Cited

UNITED STATES PATENTS

| | | | |
|---|---|---|---|
| 2,979,421 | 4/1961 | Rissman et al. | 260—555 |
| 3,117,020 | 1/1964 | Fabris et al. | 117—100 |

HENRY R. JILES, *Primary Examiner.*

UNITED STATES PATENT OFFICE
CERTIFICATE OF CORRECTION

Patent No. 3,398,191                                        August 20, 1968

Joshua Beaumont Thompson et al.

It is certified that error appears in the above identified patent and that said Letters Patent are hereby corrected as shown below:

Column 11, lines 56 and 57, "cooling air; and discharging solid particles from said cooling zone in contact with a counter-current flow of" should read -- cooling zone in contact with a counter-current flow of cooling air; and discharging solid particles from said --.

Signed and sealed this 3rd day of February 1970.

(SEAL)
Attest:

Edward M. Fletcher, Jr.                              WILLIAM E. SCHUYLER, JR.
Attesting Officer                                                Commissioner of Patents